US011341622B2

(12) United States Patent
Kimura

(10) Patent No.: US 11,341,622 B2
(45) Date of Patent: May 24, 2022

(54) IMAGE PROCESSING APPARATUS, IMAGE CAPTURING APPARATUS, IMAGE PROCESSING METHOD, AND STORAGE MEDIUM

(71) Applicant: CANON KABUSHIKI KAISHA, Tokyo (JP)

(72) Inventor: Naoto Kimura, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/845,516

(22) Filed: Apr. 10, 2020

(65) Prior Publication Data

US 2020/0327649 A1 Oct. 15, 2020

(30) Foreign Application Priority Data

Apr. 15, 2019 (JP) .............................. JP2019-077354

(51) Int. Cl.
*G06T 5/00* (2006.01)
*G06T 5/20* (2006.01)
*H04N 5/235* (2006.01)
*G06T 5/50* (2006.01)

(52) U.S. Cl.
CPC ............... *G06T 5/009* (2013.01); *G06T 5/20* (2013.01); *G06T 5/50* (2013.01); *H04N 5/2355* (2013.01); *G06T 2207/20208* (2013.01)

(58) Field of Classification Search
CPC .. G06T 5/009; G06T 5/20; G06T 5/50; G06T 2207/20208; G06T 7/0016; G06T 7/62; G06T 2207/10081; G06T 2207/30104; G06T 2207/30196; H04N 5/2355; H04N 5/23229; A61B 6/504; A61B 6/03; A61B 6/5217; A61B 6/5235; G16H 50/20; G16H 20/13; G16H 20/40; G16H 30/20; G16H 50/30; G16H 30/40

See application file for complete search history.

(56) References Cited

U.S. PATENT DOCUMENTS

| 2017/0256039 | A1* | 9/2017 | Hsu | G09G 5/02 |
| 2017/0330312 | A1* | 11/2017 | Nam | H04N 5/202 |
| 2018/0061026 | A1* | 3/2018 | Kozuka | H04N 21/435 |
| 2018/0152686 | A1* | 5/2018 | Wozniak | H04N 7/147 |
| 2018/0241979 | A1* | 8/2018 | Kanda | G09G 5/36 |
| 2020/0013151 | A1* | 1/2020 | Atkins | G06T 5/009 |

FOREIGN PATENT DOCUMENTS

| JP | 2014-154108 A | 8/2014 |
| JP | 2016-225965 A | 12/2016 |

* cited by examiner

Primary Examiner — Emily C Terrell
Assistant Examiner — Molly Delaney
(74) Attorney, Agent, or Firm — Cowan, Liebowitz & Latman, P.C.

(57) ABSTRACT

There is provided an image processing apparatus. An obtaining unit obtains image data having a first dynamic range, the image data having been applied with a predetermined tone curve, the predetermined tone curve being a tone curve representing visual characteristics based on a relationship between the first dynamic range and an absolute luminance that is output. A first compression unit compresses the image data from the first dynamic range to a second dynamic range narrower than the first dynamic range while maintaining the predetermined tone curve.

11 Claims, 9 Drawing Sheets

IMAGE PROCESSING APPARATUS, IMAGE CAPTURING APPARATUS, IMAGE PROCESSING METHOD, AND STORAGE MEDIUM

BACKGROUND OF THE INVENTION

Field of the Invention

The present invention relates to an image processing apparatus, an image capturing apparatus, an image processing method, and a storage medium.

Description of the Related Art

In recent years, with increased display luminance of a display, a High Dynamic Range (HDR) camera system has been proposed that obtains images allowing reproduction of high luminance-side tones, which are compressed in the related art, at tones providing appearance closer to the actual look. An OETF curve used when an HDR camera system is used to output images has characteristics reverse to EOTF characteristics described in, for example, ST2084 corresponding to an HDR standard. By executing processing of using the OETF curve to convert an image captured by a camera, an HDR monitor can display the high luminance-side tones.

However, in an environment with a mixture of an HDR monitor and an SDR monitor, a technology is needed in which an HDR image captured by an HDR camera system is converted to an SDR image. Specific cases include a case in which a rear liquid crystal of the camera is an SDR monitor, a case in which external output to the SDR monitor is performed, and the like. In a case where an HDR image is converted to an SDR image, to make the appearance of the SDR image approximate the appearance of the HDR image, an SDR image needs to be generated, while retaining gradation expressed by the HDR image, reducing color deviation such that the hue of a subject varies.

Japanese Patent Laid-Open No. 2016-225965 discloses a technology in which an HDR image is converted to an SDR image by executing RGB tone mapping processing for from a dark portion to an intermediate luminance and executing YUV tone mapping processing for from the intermediate luminance to high luminance.

However, when the technology disclosed in Japanese Patent Laid-Open No. 2016-225965 is used, switching of the tone mapping processing may be visible in a high-chroma gradation scene or the like in which luminance signal value gradually varies, which may lead to degradation of image quality.

SUMMARY OF THE INVENTION

In view of such circumstances, the present invention provides a technology for converting an HDR image to an SDR image while minimizing degradation of image quality.

According to a first aspect of the present invention, there is provided an image processing apparatus comprising: an obtaining unit configured to obtain image data having a first dynamic range, the image data having been applied with a predetermined tone curve, the predetermined tone curve being a tone curve representing visual characteristics based on a relationship between the first dynamic range and an absolute luminance that is output; and a first compression unit configured to compress the image data from the first dynamic range to a second dynamic range narrower than the first dynamic range while maintaining the predetermined tone curve.

According to a second aspect of the present invention, there is provided an image capturing apparatus comprising: the image processing apparatus according to the first aspect; an image capturing unit; and a generating unit configured to generate the image data based on an electrical signal generated by the image capturing unit.

According to a third aspect of the present invention, there is provided an image processing method executed by an image processing apparatus, comprising: obtaining image data having a first dynamic range, the image data having been applied with a predetermined tone curve, the predetermined tone curve being a tone curve representing visual characteristics based on a relationship between the first dynamic range and an absolute luminance that is output; and compressing the image data from the first dynamic range to a second dynamic range narrower than the first dynamic range while maintaining the predetermined tone curve.

According to a fourth aspect of the present invention, there is provided a non-transitory computer-readable storage medium which stores a program for causing a computer to execute an image processing method comprising: obtaining image data having a first dynamic range, the image data having been applied with a predetermined tone curve, the predetermined tone curve being a tone curve representing visual characteristics based on a relationship between the first dynamic range and an absolute luminance that is output; and compressing the image data from the first dynamic range to a second dynamic range narrower than the first dynamic range while maintaining the predetermined tone curve.

Further features of the present invention will become apparent from the following description of exemplary embodiments with reference to the attached drawings.

DESCRIPTION OF THE EMBODIMENTS

Figure 1:
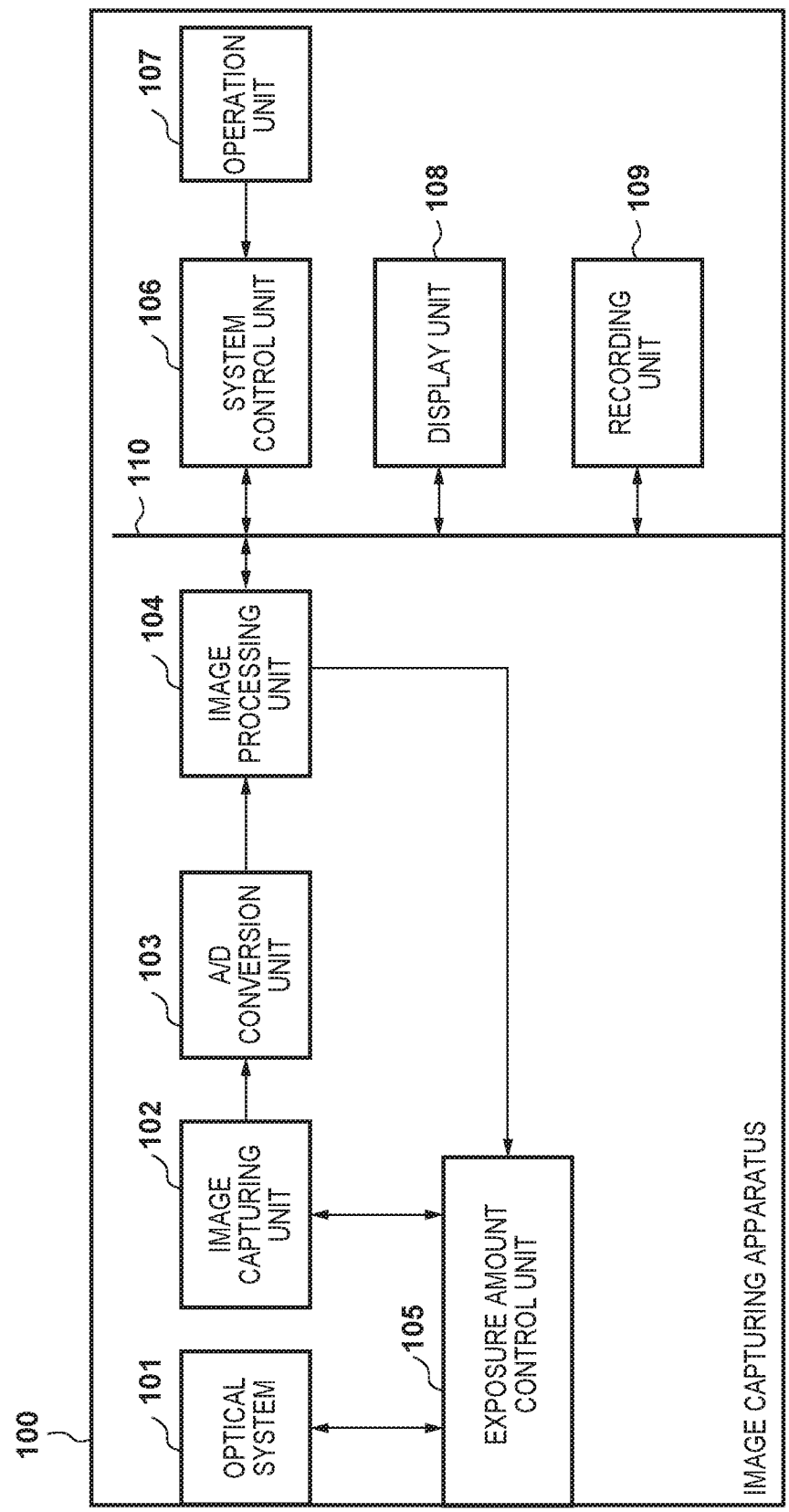
FIG. 1 is a block diagram illustrating a configuration of an image capturing apparatus 100 including an image processing apparatus.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration of an image capturing apparatus 100 including an image processing apparatus. The image capturing apparatus 100 generates an HDR image by developing a captured image using the image processing unit 104. Then, the image capturing apparatus 100, for the purpose of displaying the captured image on a display unit 108 or the like, executes processing of converting the HDR image to an SDR image by using the image processing unit 104.

Note that the HDR image refers to an image to which OETF characteristics described in, for example, ST2084 corresponding to an HDR standard are applied, and the SDR image refers to an image with a narrower output range than the HDR image. In the following description, gamma for the HDR image is assumed to be an OETF characteristic in ST2084 (hereinafter also referred to as "PQ gamma"), and a color gamut of the HDR image is assumed to be Rec. 2020. Additionally, the gamma for the SDR image is assumed to be sRGB gamma, and the color gamut of the SDR image is assumed to be sRGB.

In FIG. 1, an optical system 101 includes a lens group including a zoom lens, a focusing lens, and the like, an aperture adjusting apparatus, and a shutter apparatus. The optical system 101 adjusts a magnification, a focus position, and an amount of light of a subject image reaching an image capturing unit 102. The image capturing unit 102 includes a photoelectric conversion element such as a CCD or a CMOS sensor that converts a light beam from the subject, passed through the optical system 101, to an electrical signal through photoelectric conversion. An A/D conversion unit 103 converts an input analog signal to a digital image.

In addition to normal signal processing, the image processing unit 104 executes exposure amount calculation processing, processing of converting an HDR image to an SDR image (HDR-SDR conversion processing), and the like. The image processing unit 104 can execute similar image processing not only on images output from the A/D conversion unit 103, but also on images read from a recording unit 109. A configuration related to the HDR-SDR conversion processing in the image processing unit 104 will be described below with reference to FIG. 2.

To achieve the exposure amount calculated by the image processing unit 104, the exposure amount control unit 105 controls the optical system 101 and the image capturing unit 102 to control the aperture, a shutter speed, and an analog gain of a sensor.

A system control unit 106 is a control function unit that controls and integrates operations of the entire image capturing apparatus 100. The system control unit 106 also executes drive control of the optical system 101 and the image capturing unit 102 based on a luminance value obtained from an image processed by the image processing unit 104 and an instruction transmitted from an operation unit 107.

A display unit 108 is constituted by a liquid crystal display or an organic Electro Luminescence (EL) display, and displays images generated by the image processing unit 104 and images read from the recording unit 109. The recording unit 109 may have a function of recording images, and the recording unit 109 may include an information recording medium using, for example, a memory card in which a semiconductor memory is mounted or a package containing a rotational recording medium such as a magneto-optical disk. The information recording medium may be removable from the image capturing apparatus 100.

A bus 110 is used to exchange images and information among the image processing unit 104, the system control unit 106, the display unit 108, and the recording unit 109.

Figure 2:
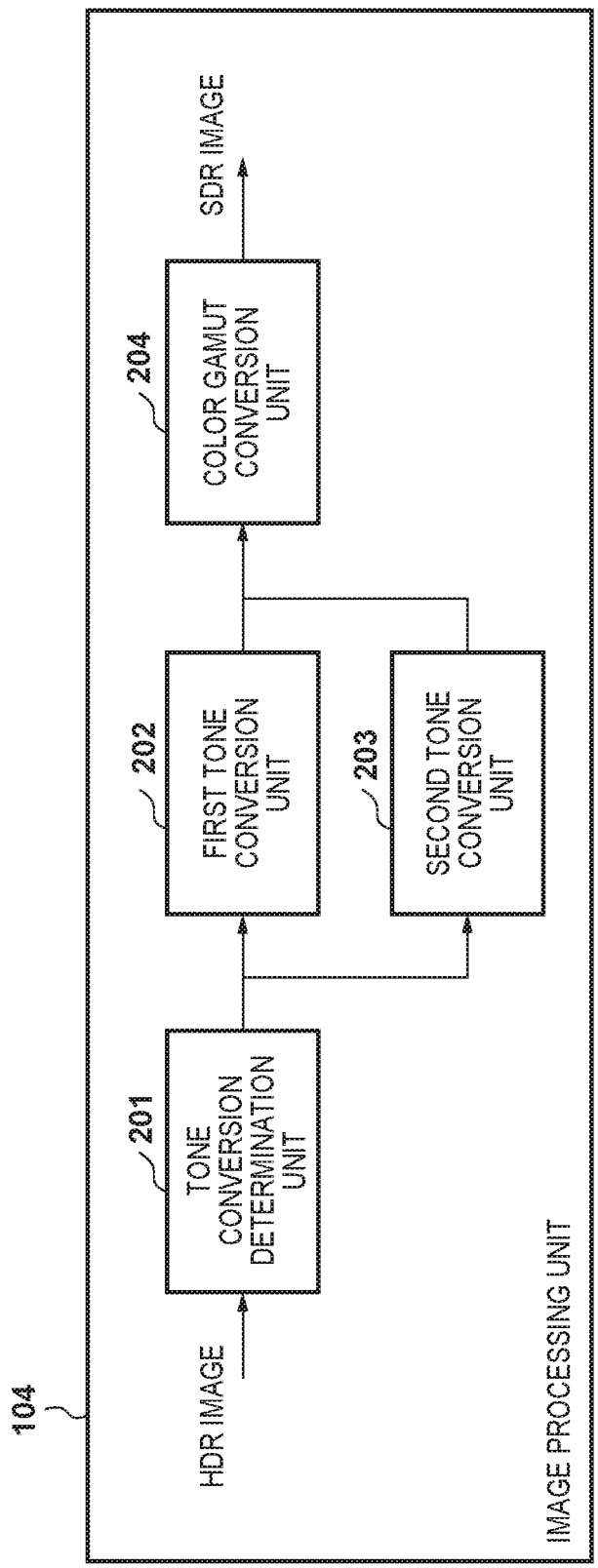
FIG. 2 is a block diagram illustrating a configuration related to HDR-SDR conversion processing in an image processing unit 104.

FIG. 2 is a block diagram illustrating a configuration related to HDR-SDR conversion processing in the image processing unit 104. The image processing unit 104 includes a tone conversion determination unit 201, a first tone conversion unit 202, a second tone conversion unit 203, and a color gamut conversion unit 204. An image input to the tone conversion determination unit 201 is an HDR image already developed by the image processing unit 104, and is constituted by three components of R, G, and B. An output image from the color gamut conversion unit 204 is an SDR image constituted by three components of R, G, and B.

The image processing unit 104 selects first tone conversion processing or second tone conversion processing as tone conversion processing of generating an SDR image depending on various conditions (e.g., an operation mode of the image capturing apparatus 100, required image quality, and a required processing speed).

Figure 5:
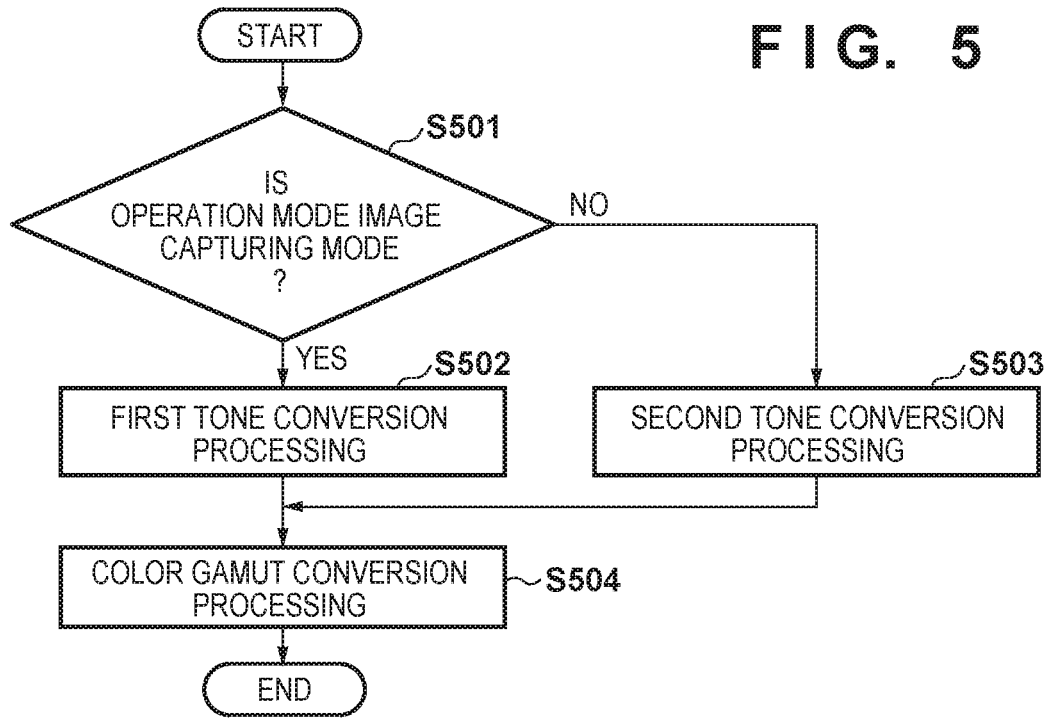
FIG. 5 is a flowchart of HDR-SDR conversion processing in the image processing unit 104.

With reference to FIG. 5, details of the HDR-SDR conversion processing in the image processing unit 104 will be described. In a case where image data to be converted (HDR image) is input to the tone conversion determination unit 201, processing in the flowchart of FIG. 5 is started.

At a step S501, the tone conversion determination unit 201 determines whether the operation mode of the image capturing apparatus 100 is an image capturing mode. In a case of an image capturing mode, the processing proceeds to the step S502, and otherwise (e.g., in a reproduction mode), the processing proceeds to a step S503. Note that, in the case of the image capturing mode, the HDR image to be converted is an HDR image being captured. On the other hand, in a case of the reproduction mode, the HDR image to be converted is an HDR image read from the recording unit 109.

At the step S502, the first tone conversion unit 202 executes first tone conversion processing on the HDR image to convert the HDR image gamma to the SDR image gamma. The first tone conversion processing is processing that prioritizes image creation with natural gradation. Additionally, the first tone conversion processing is constituted by simple processing including no local processing. Details of the first tone conversion processing will be described below.

At the step S503, the second tone conversion unit 203 executes the second tone conversion processing on the HDR image to convert the HDR image gamma to the SDR image gamma. The second tone conversion processing is processing for image creation with brightness and contrast focused on. Additionally, the second tone conversion processing is constituted by local processing. Details of the second tone conversion processing will be described below.

At a step S504, the color gamut conversion unit 204 converts, to the SDR image color gamut, the color gamut of the image with tones converted by the first tone conversion unit 202 or the second tone conversion unit 203. This processing may be processing based on simple matrix conversion processing or may be color gamut mapping process using an LUT.

Note that, in the example in FIG. 5, the first tone conversion processing or the second tone conversion processing is selectively executed depending on the operation mode of the image capturing apparatus 100 but that criteria for the selection are not limited to this example. For example, the image capturing apparatus 100 may be configured to select the first tone conversion processing or the second tone conversion processing depending on image capturing conditions for the HDR image to be reproduced, even in a case where the operation mode of the image capturing apparatus 100 is the reproduction mode. Alternatively, the image capturing apparatus 100 may be configured to select the first tone conversion processing or the second tone conversion processing in accordance with an instruction from a user through the operation unit 107.

Figure 3:
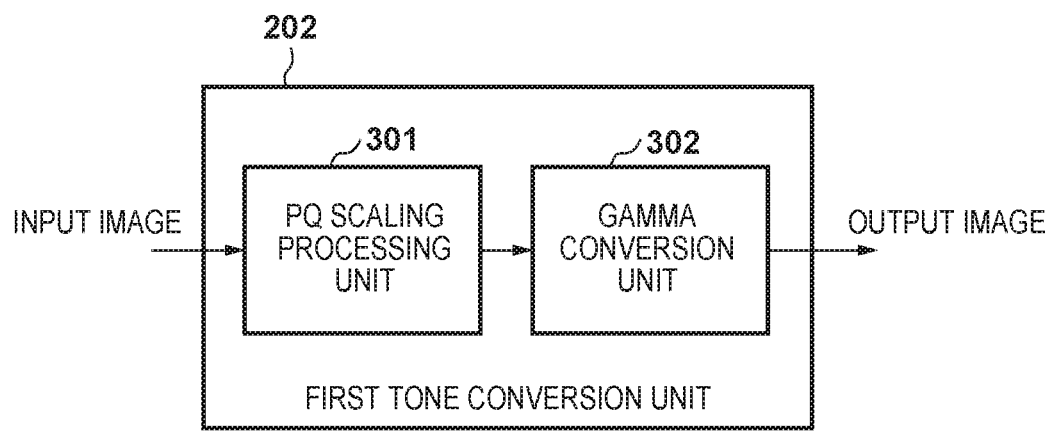
FIG. 3 is a block diagram illustrating a detailed configuration of a first tone conversion unit 202.

Now, details of the first tone conversion processing will be described with reference to FIG. 3 and FIG. 6. FIG. 3 is a block diagram illustrating a detailed configuration of the first tone conversion unit 202. The first tone conversion unit 202 includes a PQ scaling processing unit 301 and a gamma conversion unit 302.

As described above, the first tone conversion processing is processing that prioritizes image creation with natural gradation and that uniformly performs common tone conversion all over a screen without locally varying processing contents.

Figure 6:
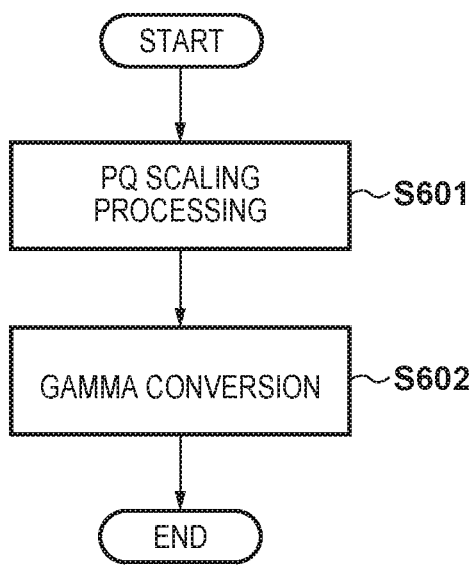
FIG. 6 is a flowchart of first tone conversion processing.

FIG. 6 is a flowchart of the first tone conversion processing. At a step S601, the PQ scaling processing unit 301 executes PQ gamma-based scaling processing (PQ scaling processing) on an input HDR image.

Figure 8:
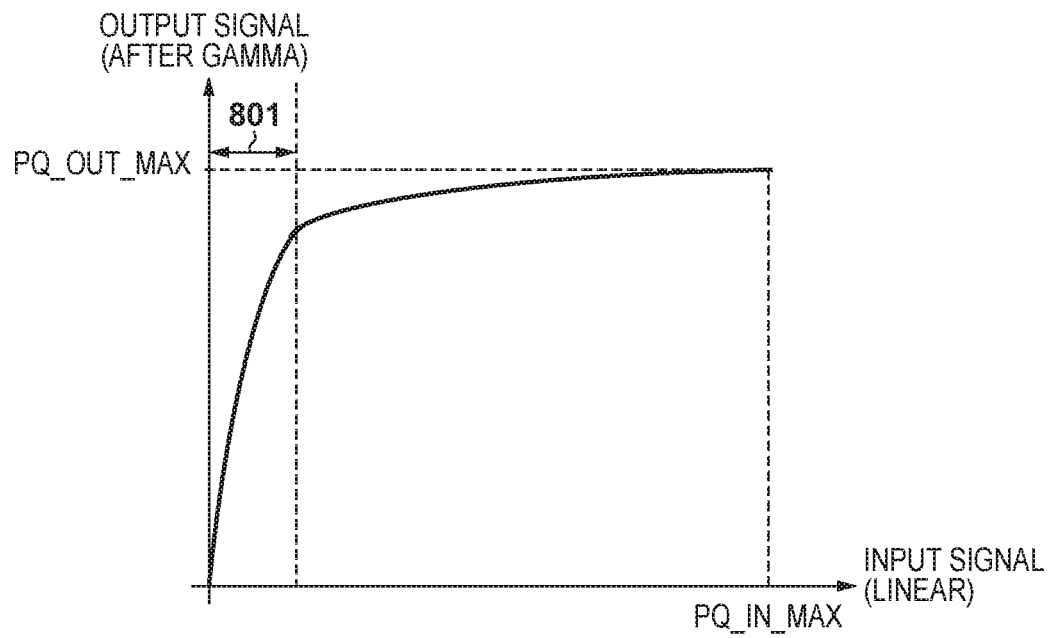
FIG. 8 is a schematic diagram of PQ gamma.

The PQ gamma will now be described with reference to FIG. 8. The PQ gamma is a tone curve (gamma curve) conforming to characteristics (OETF characteristics) that is reverse to EOTF characteristics defined in ST2084, and the PQ gamma is defined based on visual characteristics. The horizontal axis in FIG. 8 represents an input signal in a linear region, and PQ_IN_MAX is a maximum luminance in a dynamic range of the input image. Additionally, the vertical axis in FIG. 8 represents an output signal associated with an absolute luminance and to which the PQ gamma is applied. Thus, the PQ gamma may be a tone curve that represents visual characteristics based on the relationship between the dynamic range of the image data (first dynamic range) and the absolute luminance that is output.

Note that the present embodiment will be described using, as an example of image data to be converted, an HDR image to which the PQ gamma is applied. However, the tone curve applied to the image data to be converted is not limited to the PQ gamma. The tone curve (predetermined tone curve) applied to the image data to be converted may be arbitrary tone curve that represents visual characteristics based on the relationship between the dynamic range of the image data (the first dynamic range) and the absolute luminance that is output. In addition, even in a case where another type of tone curve (e.g., hybrid log gamma) is applied to the image data to be converted, similar HDR-SDR processing can be applied by performing, on the image data, degamma and conversion to the PQ gamma.

Figure 9:
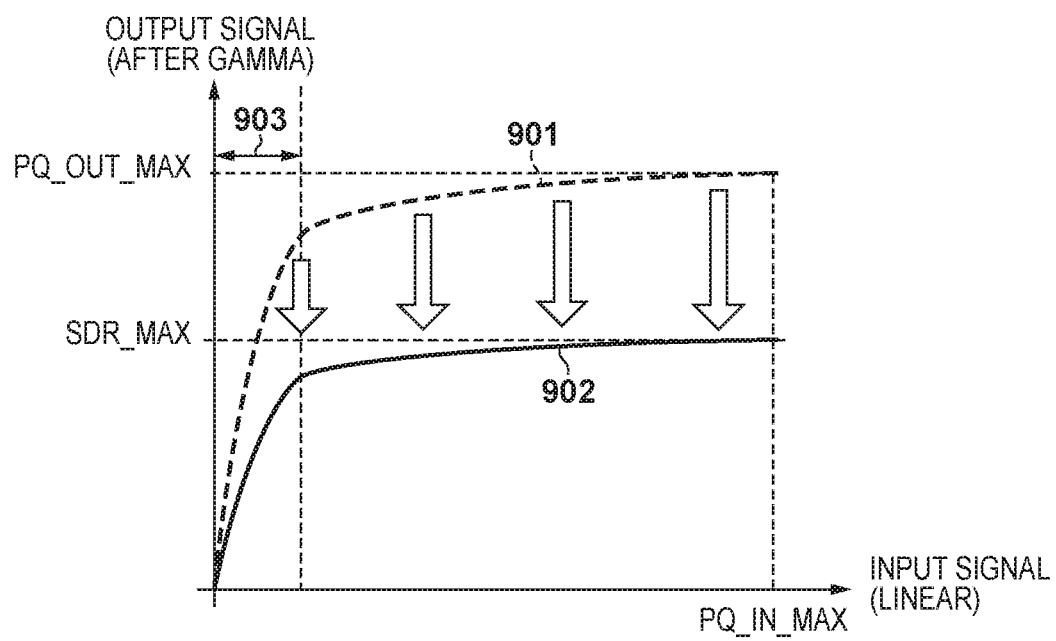
FIG. 9 is a schematic diagram of PQ scaling processing.

As can be appreciated from FIG. 8, in the PQ gamma, a large number of tones are allocated to a signal region 801 of a dark portion. The PQ gamma is represented by Formula 1 below. In Formula 1, p_in is a value obtained by normalizing R, G, and B input signals in the linear region to 0.0 to 1.0, 0.0 corresponds to a luminance value of 0 cd/m², and 1.0 corresponds to a luminance value of 10000 cd/m². p_out is a value obtained by normalizing, to 0.0 to 1.0, R, G, and B output signals to which gamma is applied, 1.0 corresponds to an upper limit value depending on the number of output bits, and 0.0 corresponds to a lower limit value. For example, in a case where the number of output bits is 10 bits, the upper limit value is 1023 and the lower limit value is 0.

$$\text{p\_out} = \left(\frac{c_1 + c_2 \cdot \text{p\_in}^{m_1}}{1 + c_3 \cdot \text{p\_in}^{m_1}}\right)^{m_2} \qquad (1)$$

where $m_1 = 0.1593017578125$ $m_2 = 78.84375$ $c_1 = 0.8359375$ $c_2 = 18.8515625$ $c_3 = 18.6875$ Now, the PQ scaling processing represented by Formula 1 will be described with reference to FIG. 9. As described above, the PQ gamma as indicated by a dotted line 901 in FIG. 9 is applied to the input HDR image. When PQ_IN_MAX is set to be a maximum value of an input signal for an HDR image (maximum luminance in the dynamic range), the PQ gamma output value corresponds to the PQ gamma for which the maximum value is represented by PQ_OUT_MAX according to Formula 1.

Thus, when SDR_MAX is set to be a value obtained by representing a maximum value of an output range of an SDR image using the PQ gamma output value, processing of scaling the PQ gamma is represented by Formula 2 below. In Formula 2, p_R, p_G, and p_B refer to an R signal value, a G signal value, and a B signal value for the HDR image and correspond to the PQ gamma output value according to Formula 1. p_s_R, p_s_G, and p_s_B refer to signal values resulting from the PQ scaling processing.

$$p\_s\_R = k \times p\_R \qquad (2)$$
$$p\_s\_G = k \times p\_G$$
$$p\_s\_B = k \times p\_B$$
$$k = \frac{\text{SDR\_MAX}}{\text{PQ\_OUT\_MAX}}$$

For example, assume that PQ_IN_MAX is 400 cd/m² and that the maximum value of the output range of the SDR image is 100 cd/m². In this case, PQ_OUT_MAX (PQ gamma output value obtained in a case of inputting the maximum value of the HDR image dynamic range) can be calculated by calculating p_out by setting p_in=0.04(=400/10000) in Formula 1. Similarly, SDR_MAX (PQ gamma output value obtained in a case of inputting the maximum value of the SDR image dynamic range) can be calculated by calculating p_out by setting p_in=0.01(=100/10000) in Formula 1.

Formula 2 is illustrated in FIG. 9 as a solid line 902. In the PQ scaling processing, the characteristics of the dotted line 901 are compressed at a uniform rate by a fixed gain k represented by Formula 2. In a case where the dynamic range is compressed in this manner, many of the tones in a signal region 903 of a dark portion remain due to the characteristics of the PQ gamma. In addition, a common gain is applied to the R, G, and B signals, and thus what is called color deviation, in which the hue of a subject is changed by tone conversion, is less likely to occur. Thus, the PQ scaling processing is processing of compressing the dynamic range of image data while maintaining the PQ gamma (predetermined tone curve). In the case of FIG. 9, processing is executed in which the image data is multiplied by SDR_MAX/PQ_OUT_MAX ("second value/first value") to compress the image data from the HDR image dynamic range to the SDR image dynamic range.

Figure 10:
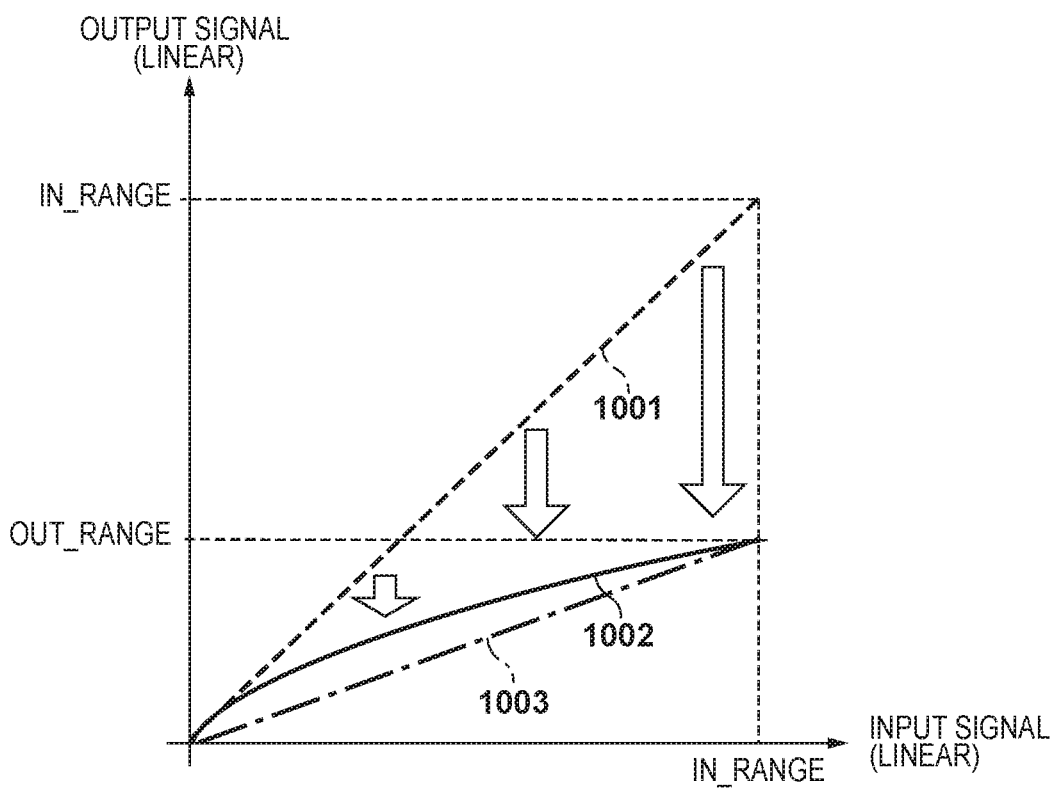
FIG. 10 is a diagram representing the effect of the PQ scaling processing in a linear space.

FIG. 10 is a diagram representing the effect of the PQ scaling processing in a linear space. In FIG. 10, the horizontal axis represents an input signal in the linear region, and the vertical axis represents an output signal in the linear region. When IN_RANGE is set to be a maximum value of an input signal for an HDR image and OUT_RANGE is set to be a maximum value of an output signal for an SDR image, a solid line 1002 represents the characteristics of the PQ scaling processing, compared to a dotted line 1001 representing the gradation characteristics of the HDR image. An alternate long and short dash line 1003 represents the characteristics of scaling processing of compressing a range of 0 to IN_RANGE linearly to a range of 0 to OUT_RANGE (processing, by compressing the luminance at a constant ratio in the linear region, to compress the dynamic range of image data). Such scaling processing is hereinafter referred to as linear scaling processing. Compared to the alternate long and short dash line 1003 representing the characteristics of the linear scaling processing, the solid line 1002 representing the characteristics of the PQ scaling processing indicates that the dark portion side is represented to appear brighter and that the gradient of the tone gradually decreases toward the high luminance side.

Note that the above description assumes that the first tone conversion processing includes the PQ scaling processing in which the image data is compressed from the HDR image dynamic range to the SDR image dynamic range. However, in a case where contrast on the high luminance side is to be focused on, part or all of the required compression may be performed by linear scaling processing instead of the PQ scaling processing. Which of the methods is used may be selected based on a user operation or in the following manner.

Figure 11A:
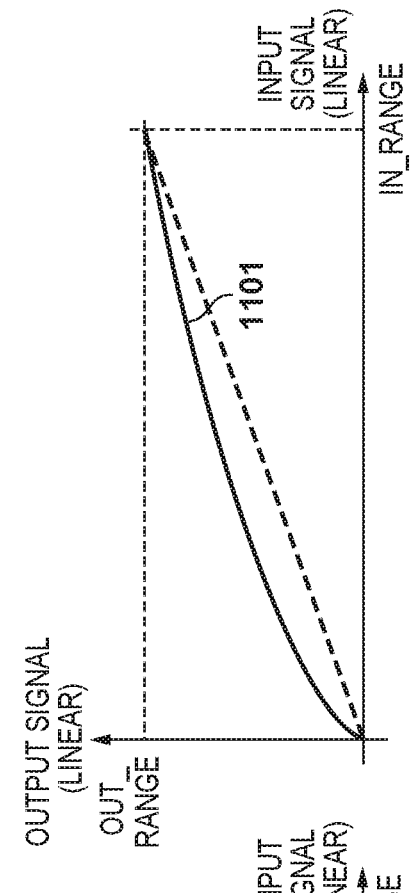
FIGS. 11A to 11D are schematic diagrams of switching between the PQ scaling processing and linear scaling processing.
Figure 11B:
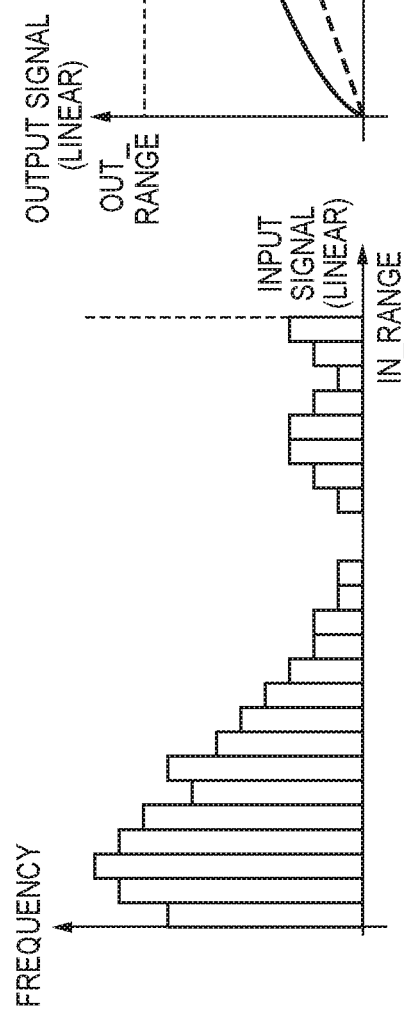
Figure 11C:
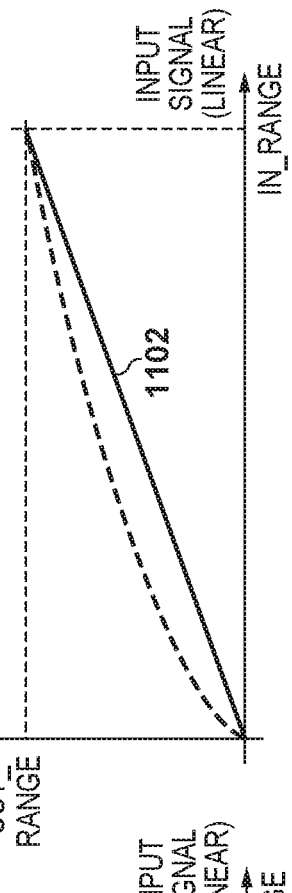
Figure 11D:
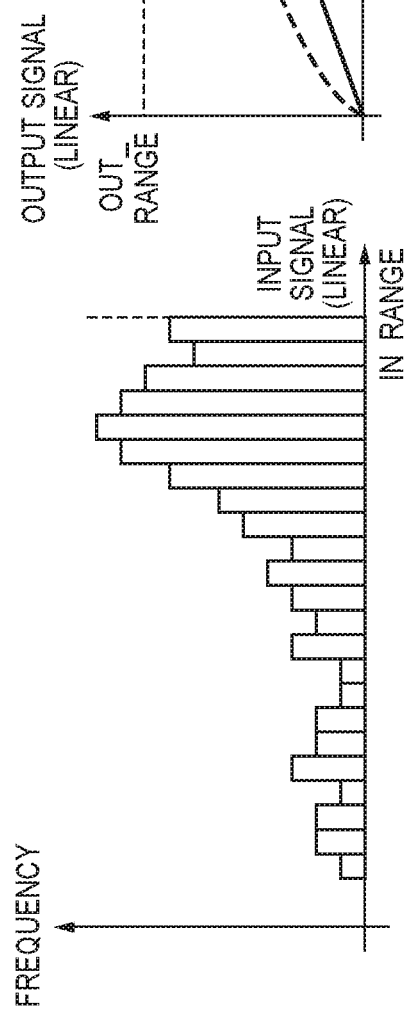

For example, the first tone conversion unit 202 analyzes a histogram of the HDR image to select which of the PQ scaling processing and the linear scaling processing is used for compression from the HDR image dynamic range to the SDR image dynamic range. For example, in a scene with a large number of dark portion subjects as illustrated in FIG. 11A, the first tone conversion unit 202 uses the PQ scaling processing as indicated by a solid line 1101 in FIG. 11B. On the other hand, in a scene with a large number of high-luminance subjects as illustrated in FIG. 11C, the first tone conversion unit 202 uses the linear scaling processing as indicated by a solid line 1102 in FIG. 11D. Note that the PQ scaling processing is executed by the PQ scaling processing unit 301 at the step S601 in FIG. 6 but that the linear scaling processing is executed by the gamma conversion unit 302 at a step S602 in FIG. 6 described below.

Figure 12A:
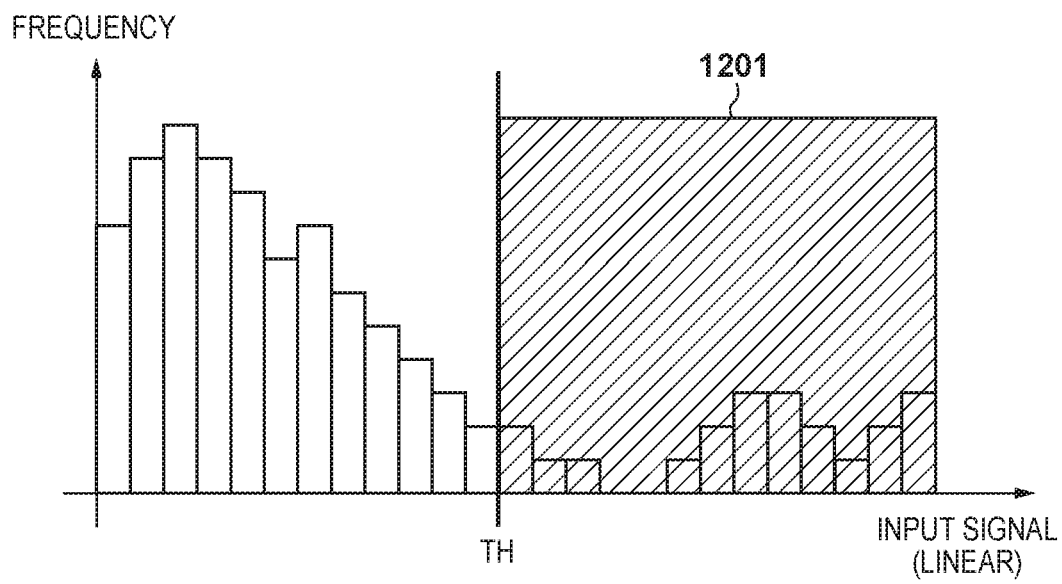
FIGS. 12A and 12B are schematic diagrams of a ratio between the PQ scaling processing and the linear scaling processing determined based on a luminance distribution of an HDR image.
Figure 12B:
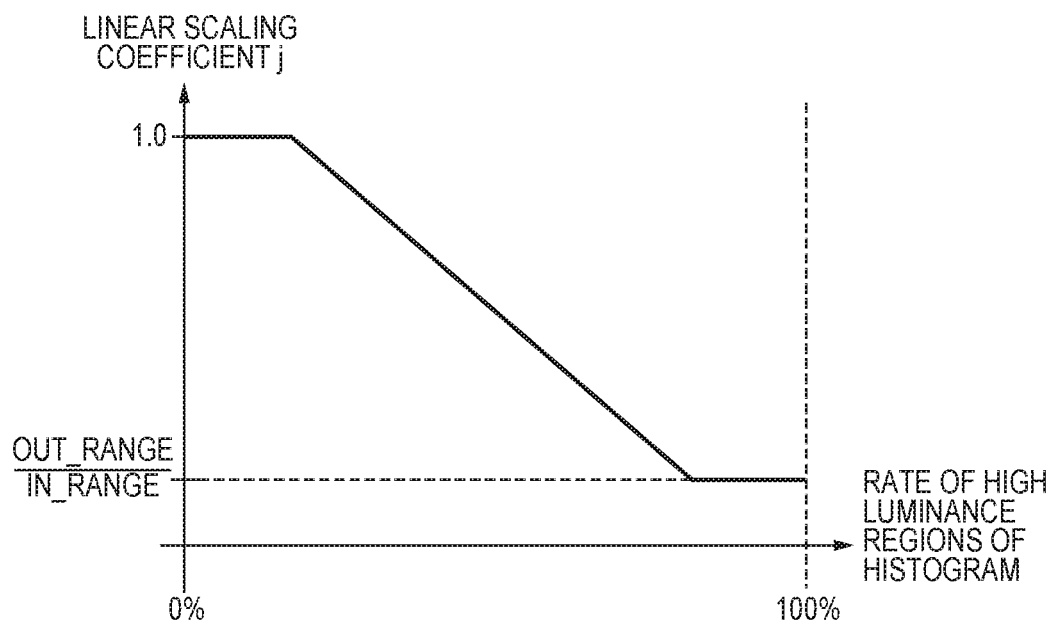

Additionally, as illustrated in FIGS. 12A and 12B, the first tone conversion unit 202 may determine the ratio between the PQ scaling processing and the linear scaling processing based on the rate of high luminance subjects (luminance distribution of the HDR image). Specifically, the first tone conversion unit 202 analyzes the histogram of the HDR image as illustrated in FIG. 12A, and calculates a rate 1201 of high luminance regions having a luminance equal to or greater than a predetermined threshold TH. Then, the first tone conversion unit 202 determines a coefficient for the linear scaling processing (linear scaling coefficient j) in accordance with a graph illustrated in FIG. 12B. In FIG. 12B, the horizontal axis represents the rate of the high luminance regions, and the vertical axis represents the linear scaling coefficient j.

The linear scaling coefficient j corresponds to the ratio of the output signal to the input signal in the linear scaling processing. Accordingly, for j=1.0, no linear scaling processing is executed, and only the PQ scaling processing is executed. On the other hand, for j=OUT_RANGE/IN_RANGE, only the linear scaling processing is executed and no PQ scaling processing is executed. As can be appreciated from FIG. 12B, an increased rate of the high luminance regions reduces the linear scaling coefficient j, awhile increasing the rate of the linear scaling processing.

For example, assume that j=0.5, IN_RANGE=400 cd/m$^2$, and OUT_RANGE=100 cd/m$^2$. In this case, 100 cd/m$^2$× (1/j)=200 cd/m$^2$. Thus, the PQ scaling processing unit 301 uses, instead of SDR_MAX, in the PQ scaling processing illustrated in FIG. 9 and Formula 2, a value resulting from representation of 200 cd/m$^2$ in a PD gamma output value. More specifically, the PQ scaling processing unit 301 calculates p_out by setting p_in=0.02(=200/10000) in Formula 1. p_out, which is thus calculated, is denoted as p_out_200. The PQ scaling processing unit 301 uses p_out_200/PQ_OUT_MAX instead of SDR_MAX/PQ_OUT_MAX as the PQ scaling coefficient k in Formula 2. Such PQ scaling processing compresses the maximum luminance of the input image from 400 cd/m$^2$ to 200 cd/m$^2$. Thus, the subsequent linear scaling processing with j=0.5 eventually compresses the maximum brightness to 100 cd/m$^2$.

In this manner, the first tone conversion unit 202 may determine an intermediate dynamic range based on the luminance distribution of the HDR image. In this case, the first tone conversion unit 202 uses the PQ scaling processing to perform compression from the HDR image dynamic range to the intermediate dynamic range, and uses the linear scaling processing to perform compression from the intermediate dynamic range to the SDR image dynamic range.

Referring back to FIG. 6, at the step S602, the gamma conversion unit 302 executes conversion processing on the image subjected to the PQ scaling processing at the step S601 for conversion to the SDR image gamma. For the gamma conversion processing, a general method can be used in which the input image is converted to a linear signal by degamma and subsequently applied with the target gamma (here, the SDR image gamma). In a case where the linear scaling processing is used together as described above (or the PQ scaling processing is replaced with the linear scaling processing), the gamma conversion unit 302 executes the linear scaling processing in accordance with the linear scaling coefficient j.

Figure 4:
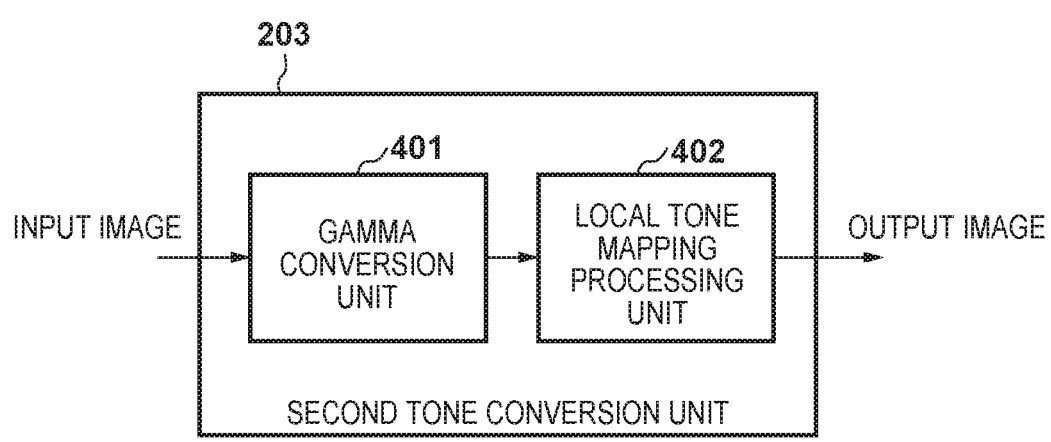
FIG. 4 is a block diagram illustrating a detailed configuration of a second tone conversion unit 203.

Now, details of the second tone conversion processing will be described with reference to FIG. 4 and FIG. 7. FIG. 4 is a block diagram illustrating a detailed configuration of the second tone conversion unit 203. The second tone conversion unit 203 includes a gamma conversion unit 401 and a local tone mapping processing unit 402.

As described above, the second tone conversion processing focuses on brightness and contrast, and includes execution of local tone mapping processing for a local change in gradation characteristics. In addition, in terms of the system, compared to the first tone conversion processing, a large memory bandwidth and a long processing time is required to generate a low frequency image and a subject determination result from the input image in order to execute local one mapping processing.

Figure 7:
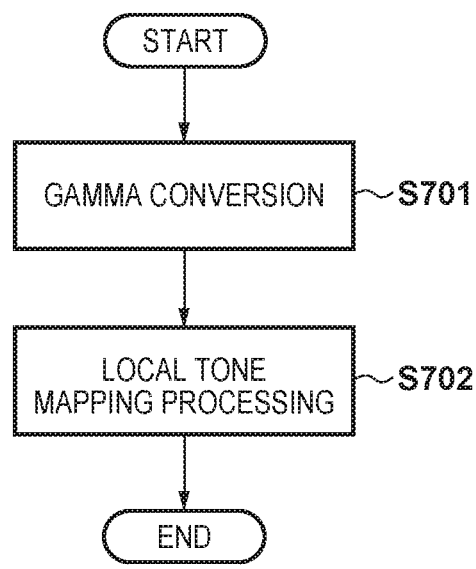
FIG. 7 is a flowchart of second tone conversion processing.

FIG. 7 is a flowchart of the second tone conversion processing. At a step S701, the gamma conversion unit 401 executes conversion processing on an input HDR image to the SDR image gamma. The gamma conversion processing is the same as the processing at the step S602 described above, and thus the description of the processing is omitted. However, at the step S701, along with the gamma conversion processing, linear scaling processing from the HDR image dynamic range to the SDR image dynamic range is also executed.

At a step S702, the local tone mapping processing unit 402 executes local tone mapping processing on the image subjected to the gamma conversion at the step S701. In the local tone mapping processing, with varying the brightness of the dark portion or bright portion, processing is executed to increase the contrast with a luminance region where tone compression or the like is to take place. In the local tone mapping processing, a general method may be used in which determination results for images or regions in different frequency bands are used to generate a gain MAP having locally varying gradation characteristics and tone processing is executed with reference to the gain MAP.

Figure 13:
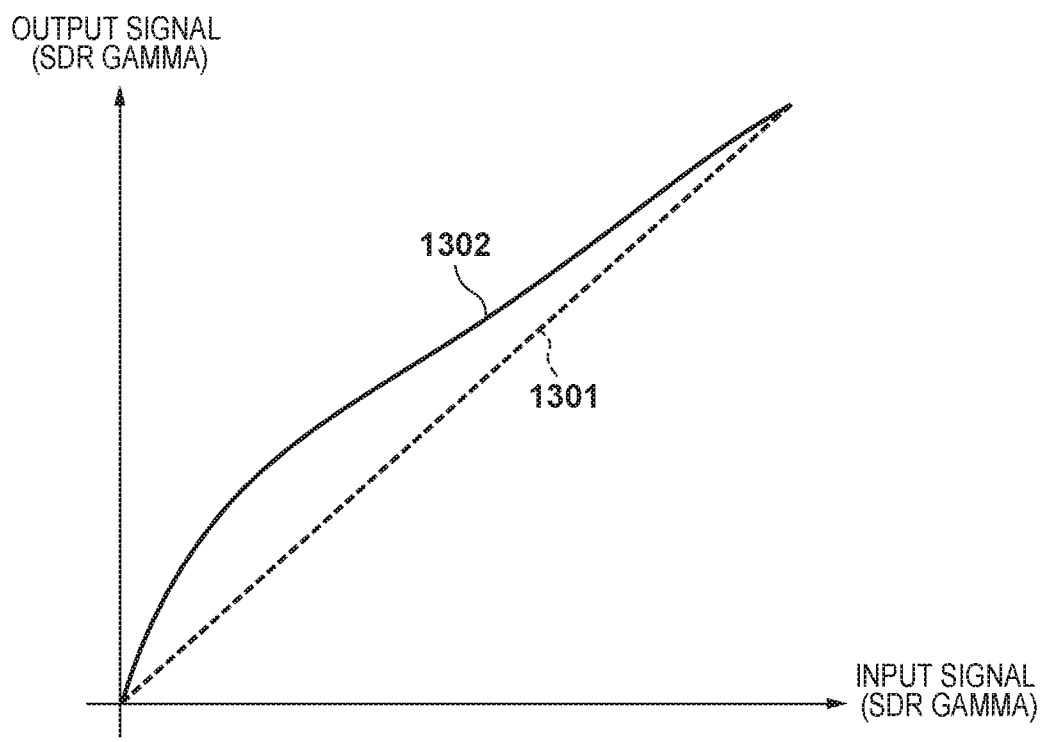
FIG. 13 is a schematic diagram of local tone mapping processing.

With reference to FIG. 13, an example of the local tone mapping processing at the step S702 will be described. For the local tone mapping processing, for example, a method as disclosed in Japanese Patent Laid-Open No. 2014-154108 can be used.

FIG. 13 is an example of gradation characteristics used in the local tone mapping. The input signal is a signal resulting from the conversion to the SDR gamma at the step S701, and the output signal is an output signal targeted for the local tone mapping processing. The signal resulting from the conversion to the SDR gamma has a brightness uniformly lower than the brightness expressed in the HDR image because the wide dynamic range of the signal is converted to be covered in the SDR range, as illustrated by the alternate long and short dash line 1003 in FIG. 10. Thus, the local tone mapping processing unit 402 creates characteristics that correct, with respect to original gradation characteristics 1301, luminance of low luminance to medium luminance to be brighter, as illustrated by gradation characteristics 1302 in FIG. 13.

In a case where x is the input signal and y is the output signal, the gradation characteristics 1302 are represented by Formula 3 below. In Formula 3, tm ( ) represents the gradation characteristics 1302.

$$y = tm(x) \quad (3)$$

When p is set to be an image signal resulting from gamma conversion and p_lpf is set to be a low frequency image generated by executing LPF processing or the like on the image signal resulting from the gamma conversion, an output signal p_out resulting from the local tone mapping is represented by Formula 4 below.

$$P\_out = \frac{tm(p\_lpf)}{p\_lpf} \times p \quad (4)$$

As described above, according to the first embodiment, the image capturing apparatus 100 performs tone conversion that compresses the obtained image data from the HDR image dynamic range to the SDR image dynamic range while maintaining the PQ gamma (predetermined tone curve). This allows the conversion of the HDR image to an SDR image while minimizing degradation of image quality.

In addition, in the first embodiment, the first tone conversion processing and the second tone conversion processing are selectively used depending on whether the operation mode of the image capturing apparatus 100 is the image capturing mode or the reproduction mode. The reason is as follows.

First, the first tone conversion processing that scales the PQ gamma imposes fewer processing loads associated with calculations and the like, than the second tone conversion processing that locally varies the tones using images with different frequencies. Accordingly, the first tone conversion processing is executed in the image capturing mode that involves relatively many types of processing with high loads other than the tone conversion processing, and the second tone conversion processing is executed in the reproduction mode that involves relatively low processing loads.

Second, a comparison between the first tone conversion processing and the second tone conversion processing indicates that the first tone conversion processing is a tone conversion that maintains as many tones of the HDR image as possible, whereas the second tone conversion processing is a tone conversion involving image creation depending on the image. Accordingly, in a case of displaying in the image capturing mode, that is, live view displaying, the first tone conversion processing is executed to maintain as many unconverted tones as possible, allowing a user to execute correct exposure control and the like while viewing the screen. In contrast, in the case of the reproduction mode, the second tone conversion processing is executed to allow checks of what image results from the final image creation.

Note that, in the first embodiment, in consideration of the magnitude of the processing loads in the image capturing mode, the first tone conversion processing is executed in the case of the image capturing mode. Accordingly, also in a case where, immediately after image capturing, images are automatically displayed for checks (what is called REC review display), the first tone conversion processing is executed. However, in a case of REC review display even in the image capturing mode, in a sense that already captured and developed images are checked, the second tone conversion processing may be executed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 7019-077354, filed on Apr. 15, 2019, which is hereby incorporated by reference herein in its entirety.

What is claimed is:

1. An image processing apparatus comprising at least one processor and/or circuit configured to function as following units:
    an obtaining unit configured to obtain image data having a first dynamic range, the image data having been applied with a predetermined tone curve, the predetermined tone curve being a tone curve representing visual characteristics based on a relationship between the first dynamic range and an absolute luminance that is output; and
    a first compression unit configured to compress, by executing scaling processing on the image data having been applied with the predetermined tone curve, a dynamic range of the image data from the first dynamic range to a second dynamic range narrower than the first dynamic range, wherein the scaling processing compresses the dynamic range of the image data without executing degamma processing on the image data having been applied with the predetermined tone curve and while maintaining the predetermined tone curve.

2. The image processing apparatus according to claim 1, wherein
    the predetermined tone curve is a tone curve conforming to OETF characteristics of PQ.

3. The image processing apparatus according to claim 1, wherein
    the first compression unit multiplies the image data by a ratio of a second value to a first value to compress the image data from the first dynamic range to the second dynamic range,
    the first value is an output value of the predetermined tone curve in a case where a maximum value of the first dynamic range is an input, and
    the second value is an output value of the predetermined tone curve in a case where a maximum value of the second dynamic range is an input.

4. The image processing apparatus according to claim 1, wherein the at least one processor and/or circuit is further configured to function as following units:
    a second compression unit configured to compress the image data from the first dynamic range to the second dynamic range by compressing luminance at a constant ratio in a linear region;
    a conversion unit configured to convert, by local tone mapping processing, tone characteristics of the image data compressed to the second dynamic range by the second compression unit; and
    a selection unit configured to select which of the first compression unit and the second compression unit is used to compress the image data from the first dynamic range to the second dynamic range.

5. The image processing apparatus according to claim 1, wherein
    the first dynamic range is an HDR image dynamic range, and
    the second dynamic range is an SDR image dynamic range.

6. The image processing apparatus according to claim 1, wherein
    the first compression unit determines the second dynamic range based on a luminance distribution of the image data, and
    the at least one processor and/or circuit is further configured to function as a third compression unit configured to compress the image data, which have been compressed to the second dynamic range, to a third dynamic range narrower than the second dynamic range, by compressing luminance at a constant ratio in a linear region.

7. The image processing apparatus according to claim 6, wherein
    the first compression unit determines the second dynamic range such that a width of the second dynamic range increases as the luminance distribution of the image data biases toward high luminance.

8. The image processing apparatus according to claim 6, wherein
    the first dynamic range is an HDR image dynamic range, and
    the third dynamic range is an SDR image dynamic range.

9. An image capturing apparatus comprising:
    the image processing apparatus according to claim 1;
    an image sensor; and
    at least one processor and/or circuit configured to function as a generating unit configured to generate the image data based on an electrical signal generated by the image sensor.

10. An image processing method executed by an image processing apparatus, comprising at least one processor and/or circuit configured to function as following units:
    obtaining image data having a first dynamic range, the image data having been applied with a predetermined tone curve, the predetermined tone curve being a tone curve representing visual characteristics based on a relationship between the first dynamic range and an absolute luminance that is output; and
    compressing by executing scaling processing on the image data having been applied with the predetermined tone curve, a dynamic range of the image data from the first dynamic range to a second dynamic range narrower than the first dynamic range, wherein the scaling processing compresses the dynamic range of the image data without executing degamma processing on the image data having been applied with the predetermined tone curve and while maintaining the predetermined tone curve.

11. A non-transitory computer-readable storage medium which stores a program for causing a computer to execute an image processing method comprising at least one processor and/or circuit configured to function as following units:

obtaining image data having a first dynamic range, the image data having been applied with a predetermined tone curve, the predetermined tone curve being a tone curve representing visual characteristics based on a relationship between the first dynamic range and an absolute luminance that is output; and compressing by executing scaling processing on the image data having been applied with the predetermined tone curve, a dynamic range of the image data from the first dynamic range to a second dynamic range narrower than the first dynamic range, wherein the scaling processing compresses the dynamic range of the image data without executing degamma processing on the image data having been applied with the predetermined tone curve and while maintaining the predetermined tone curve.

\* \* \* \* \*